United States Patent
Balda Belzunegui et al.

(10) Patent No.: US 9,548,610 B2
(45) Date of Patent: Jan. 17, 2017

(54) CONTROL METHOD FOR ARRANGING DC/AC CONVERTERS IN PARALLEL

(75) Inventors: Julián Balda Belzunegui, Sarriguren (ES); Carlos Gironés Remírez, Zamudio (ES)

(73) Assignee: INGETEAM POWER TECHNOLOGY, S.A., Zamudio (ES)

( * ) Notice: Subject to any disclaimer, the term of this patent is extended or adjusted under 35 U.S.C. 154(b) by 734 days.

(21) Appl. No.: 13/823,599

(22) PCT Filed: Sep. 14, 2010

(86) PCT No.: PCT/ES2010/070598
§ 371 (c)(1),
(2), (4) Date: May 30, 2013

(87) PCT Pub. No.: WO2012/035175
PCT Pub. Date: Mar. 22, 2012

(65) Prior Publication Data
US 2013/0234524 A1    Sep. 12, 2013

(51) Int. Cl.
*H02J 1/00* (2006.01)
*H02J 3/00* (2006.01)
*H02M 7/493* (2007.01)
*H02M 1/12* (2006.01)
*H02J 3/38* (2006.01)

(52) U.S. Cl.
CPC .............. *H02J 3/00* (2013.01); *H02M 7/493* (2013.01); *H02J 3/383* (2013.01); *H02M 2001/123* (2013.01); *Y02E 10/563* (2013.01); *Y10T 307/707* (2015.04)

(58) Field of Classification Search
CPC ............ H02J 3/00; H02J 3/383; H02M 7/493; Y10T 307/707; Y02E 10/563

USPC ............................................. 307/82; 136/244
See application file for complete search history.

(56) References Cited

U.S. PATENT DOCUMENTS

| | | | | |
|---|---|---|---|---|
| 7,808,125 | B1* | 10/2010 | Sachdeva | H02M 7/49 307/30 |
| 2003/0151259 | A1* | 8/2003 | Feddersen | F03D 7/0224 290/44 |
| 2004/0164557 | A1* | 8/2004 | West | H02M 7/48 290/1 R |
| 2006/0006741 | A1 | 1/2006 | Tassitino et al. | |
| 2008/0030078 | A1* | 2/2008 | Whitted | H02J 9/061 307/66 |

(Continued)

FOREIGN PATENT DOCUMENTS

EP    1 796 254 A2    6/2007

OTHER PUBLICATIONS

International Search Report issued May 26, 2011 in PCT/ES2010/070598.

(Continued)

*Primary Examiner* — Jared Fureman
*Assistant Examiner* — Alfonso Perez Borroto
(74) *Attorney, Agent, or Firm* — Sughrue Mion, PLLC

(57) ABSTRACT

A control method for multi-converter systems wherein all DC/AC converters (1.1-1.*n*) are connected to a single transformer (2) via a single primary winding. The method of the present invention stands out mainly because it controls the common-mode voltage generated by the different DC/AC converters (1.1-1.*n*) so that said voltage falls mainly on the transformer (2).

14 Claims, 6 Drawing Sheets

(56) References Cited

U.S. PATENT DOCUMENTS

| | | | |
|---|---|---|---|
| 2009/0185400 A1 | 7/2009 | Okui | |
| 2009/0230689 A1* | 9/2009 | Burra | F03D 9/003 290/55 |
| 2010/0141041 A1* | 6/2010 | Bose | H02M 7/487 307/82 |
| 2010/0157634 A1* | 6/2010 | Yu | H02J 3/38 363/98 |
| 2011/0216562 A1* | 9/2011 | Gengenbach | H02J 3/18 363/71 |
| 2011/0232714 A1* | 9/2011 | Bhavaraju | H02J 3/385 136/244 |

OTHER PUBLICATIONS

Tuladhar A. et al., Parallel operation of single phase inverter modules with no control interconnections, Applied Power Electronics Conference and Exposition, 1997. APEC '97 Conference Proceedings 1997, twelfth annual Atlanta GA, USA Feb. 23-27, 1997, New York, NY, USA, IEEE, US, vol. 1, Feb. 23, 1997, pp. 94-100.

International Preliminary Report on Patentability issued Dec. 3, 2012 in PCT/ES2010/070598.

Written Opinion of the International Searching Authority issued May 26, 2011 in PCT/ES2010/070598.

Bezzolato et al., Reduction of High Frequency zero sequence harmonics in parallel connected PV-inverters, Proceedings of the 2011—14th European Conference on Power Electronics and Applications (EPE 2011), Jan. 1, 2011 (Jan. 1, 2011), pp. 1-10, XP55161712, ISBN: 978-1-61-284167-0.

WeiYu et al., Parallel Control of the UPS Inverters, Applied Power Electronics Conference and Exposition, 2008. Apec 2008. Twenty-Third Annual IEEE, IEEE, Piscataway, NJ, USA, Feb. 24, 2008 (Feb. 24, 2008), pp. 939-944, XP031253360, ISBN: 978-1-4244-1873-2.

Communication dated Jan. 22, 2015, issued by the European Patent Office in corresponding application No. 10 774 240.5.

* cited by examiner

CONTROL METHOD FOR ARRANGING DC/AC CONVERTERS IN PARALLEL

CROSS REFERENCE TO RELATED APPLICATIONS

This application is a National Stage of International Application No. PCT/ES2010/070598 filed Sep. 14, 2010, the contents of all of which are incorporated herein by reference in their entirety.

OBJECT OF THE INVENTION

The present invention has its main field of application in the industry dedicated to the design of electronic devices, and more specifically in those devices conceived within the sector of power systems for converting photovoltaic solar energy. The invention could also be applied in other fields such as wind generation, or power generation by electrochemical cells or other devices that supply continuous power.

The object of the invention is to provide a control method for connecting DC/AC conversion structures in parallel, which stands out mainly because it minimises the problems of electromagnetic compatibility (EMC) and electric risks for both the staff and the components of an installation.

BACKGROUND OF THE INVENTION

Photovoltaic installations that connect to the power grid are formed by a set of photovoltaic panels (photovoltaic generator) and an electronic DC/AC converter, also called an inverter, that conditions the energy produced by the panels and injects it into the power grid.

This type of installation traditionally includes a low-frequency transformer between the converter and the power grid. This transformer provides galvanic insulation between the installation and the grid. Moreover, this transformer can be used to raise the output voltage of the converter.

The converter is made up of power transistors that switch at high-frequency to convert the direct current provided by the photovoltaic generator into alternating current that is injected into the power grid. This switching generates a variable voltage between the live parts and ground. Said voltage is called the common-mode voltage ($V_{CM}$).

As can be seen in FIG. 1a, the photovoltaic generator has a parasitic capacity between the active terminals (positive and negative) and the ground ($C_{PV}$), this parasitic capacity being proportional to the area and therefore to the power of the generator. On the other hand, the transformer has a parasitic capacity between the primary and secondary windings ($C_T$). The whole system can be reduced to a simplified common-mode equivalent shown in FIG. 1b.

Since the capacity of the transformer is much less than that of the photovoltaic generator, the common-mode voltage generated by the converter falls mostly on the transformer, therefore eliminating high-frequency voltage variations between the input terminals and ground. However, low-frequency transformers have several drawbacks, such as:

Large size
Large weight
Considerable increase in installation price
Reduced system output.

Generally, large power facilities are formed by a set of DC/AC converters, each of which have their own transformer and photovoltaic generator, working in parallel to the same grid, as shown in FIG. 2a. Under these conditions, the whole system can be reduced to its simplified common-mode equivalent, shown in FIG. 2b.

As can be seen, the system's behaviour in common mode can be studied as if it consisted of independent DC/AC converters. Therefore, each transformer supports the common-mode voltage, eliminating the variations in high-frequency voltage between the input terminals of the photovoltaic generator and ground.

One current solution to improve the output and reduce installation costs is to remove the transformer associated to each of the DC/AC converters, replacing it by a single transformer for the entire installation, as shown in FIG. 3a, using an isolated ground (IG) wiring scheme in the part of the DC/AC converters. This type of facilities improves the efficiency of the installation and reduces its cost. However, when removing the transformers associated to each converter a new common-mode circuit is created that connects all the DC/AC converters to a same equivalent point, resulting in the simplified diagram of FIG. 3b.

This type of installations can produce undesired variations in high-frequency voltage between the input terminals and ground if the common-mode voltages of the different DC/AC converters are not the same. The occurrence of variations in high-frequency voltage between the input terminals and ground can damage the insulation of the photovoltaic generator, implying a risk for people. Moreover, the occurrence of these voltages generates problems of electromagnetic compatibility (EMC).

One alternative to solve this problem is to use a transformer with several primary windings to which each converter is connected, and a single secondary winding connected to the power grid, as shown in FIG. 4. In this case, the effect regarding the variation in high-frequency voltage between the input terminals and ground is similar to placing independent transformers in series with each converter. However, transformers of this type are not conventional, are difficult to manufacture and are more expensive.

Another alternative is the use of converters without a transformer, using modulation techniques to eliminate the variations in high-frequency voltage between input terminals and ground. However, these converters have lower output and present technical difficulties for achieving high power.

DESCRIPTION OF THE INVENTION

The invention proposed solves the drawbacks mentioned above by providing a control method for multi-converter systems in which all the converters are connected to a single transformer with a single primary winding.

The method of the present invention stands out mainly because it controls the common-mode voltage generated by the different converters so that said voltage falls mainly on the transformer. Therefore, the voltage from the different input terminals of the DC power supply remain constant with respect to ground, eliminating insulation problems for the photovoltaic generator, risk for people and EMC problems. This achieves a robust system that allows reducing costs and improving output with respect to other state of the art solutions. To do this, the control method herein described matches the common-mode voltage generated by the different converters such that, since the transformer capacity is much less than that of the photovoltaic generator, the common-mode voltage generated by the converters falls mainly on the transformer.

The DC power supply can be a photovoltaic generator, a wind turbine with DC output, an energy generation device by electrochemical cells or other devices that provide direct current power.

As explained above, the common-mode voltage is associated to the switching of the power transistors of the DC/AC converters. One method to generate said switches is, for example, to use pulse width modulation (PWM). This method is based on comparing a modulating signal (the one that contains the information) with a carrier signal, determining the commands for turning on the transistors according to the instantaneous values of both signals.

In order to match the common-mode voltages generated by the different converters, the method proposed uses a single carrier signal.

A second preferred embodiment relates to systems where it is not possible to use the same carrier signal for all converters. In these cases the method proposed implements a system, which in a preferred embodiment is an auxiliary device that matches the different carrier signals from the different converters.

The control method of this invention can be applied both in systems in which the direct current generation field is independent in each converter or shared by several converters.

Similarly, the DC power supplies can be grounded at one point or can have a floating ground configuration.

DESCRIPTION OF THE DRAWINGS

In order to complement the description being made and to aid towards a better comprehension of the features of the invention, according to a preferred practical embodiment, a set of drawings is incorporated as an integral part of said description that are illustrative and not limiting in nature, and represent the following.

PREFERRED EMBODIMENT OF THE INVENTION

Some examples of the invention will be described below based on the figures described above.

Figure 1A:
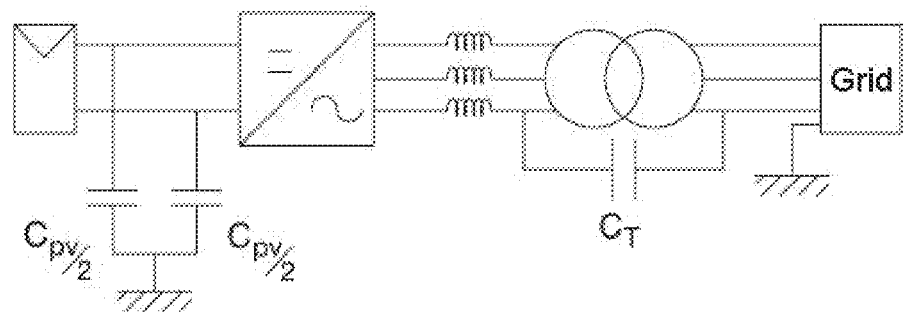
FIG. 1a. Shows a diagram for a photovoltaic installation according to the state of the art.
Figure 1B:
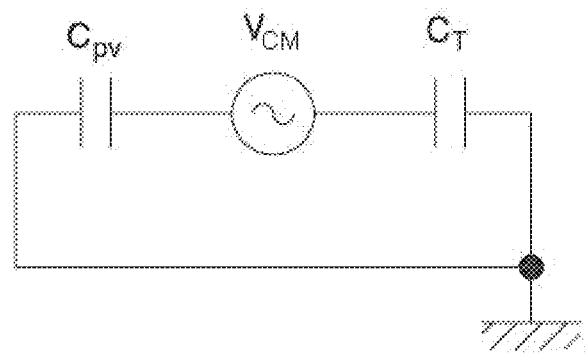
FIG. 1b. Shows a common-mode simplified equivalent diagram of a photovoltaic installation according to the state of the art.
Figure 2A:
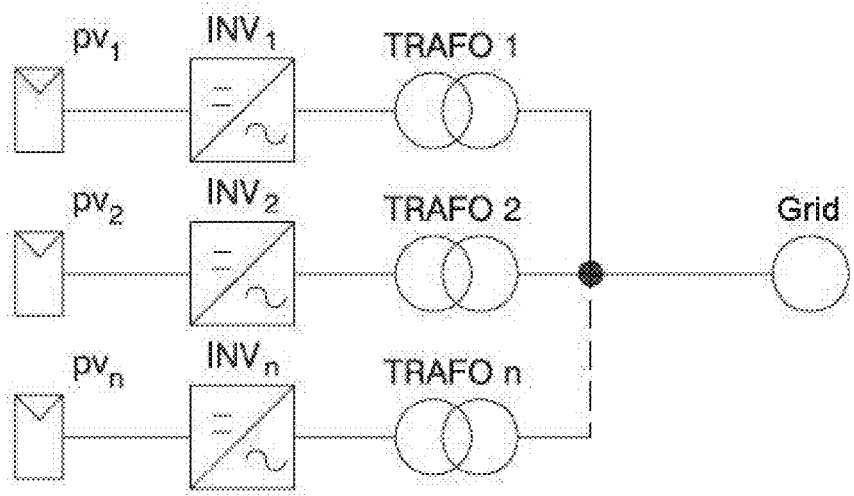
FIG. 2a. Shows a diagram for a photovoltaic installation formed by a set of converters with transformers that have independent galvanic insulation according to the state of the art.
Figure 2B:
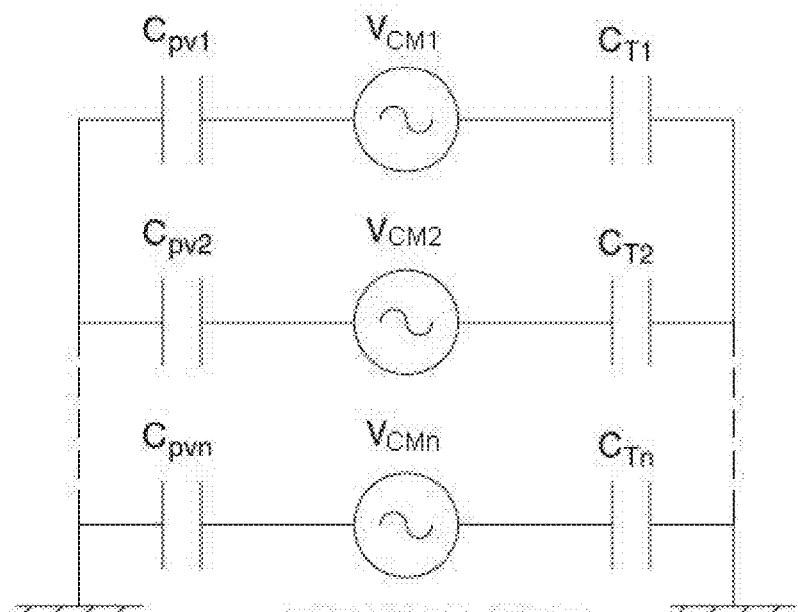
FIG. 2b. Shows a common-mode simplified equivalent diagram for a photovoltaic installation formed by a set of converters with transformers that have independent galvanic insulation according to the state of the art.
Figure 3A:
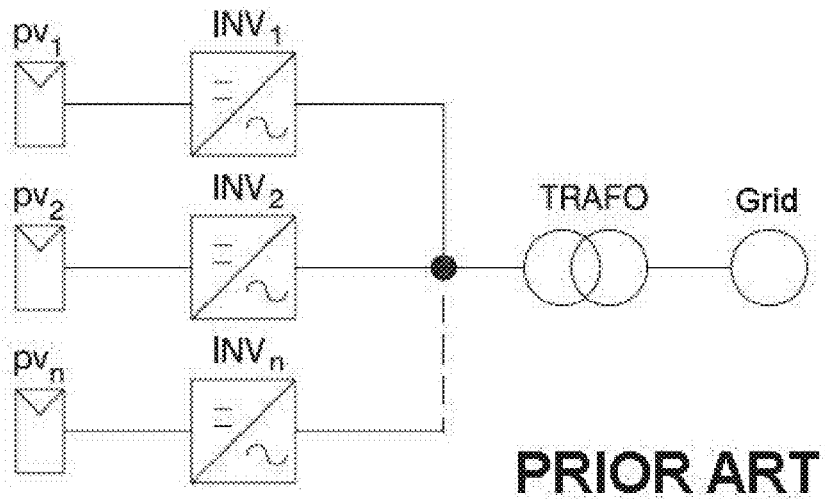
FIG. 3a. Shows a diagram for a photovoltaic installation formed by a set of converters connected to a single transformer according to the state of the art.
Figure 3B:
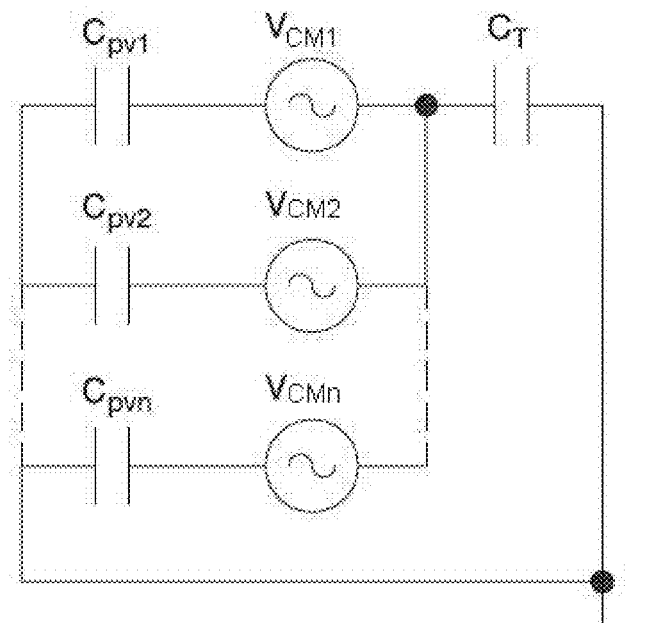
FIG. 3b. Shows a common-mode simplified equivalent diagram for a photovoltaic installation formed by a set of converters connected to a single transformer according to the state of the art.
Figure 4:
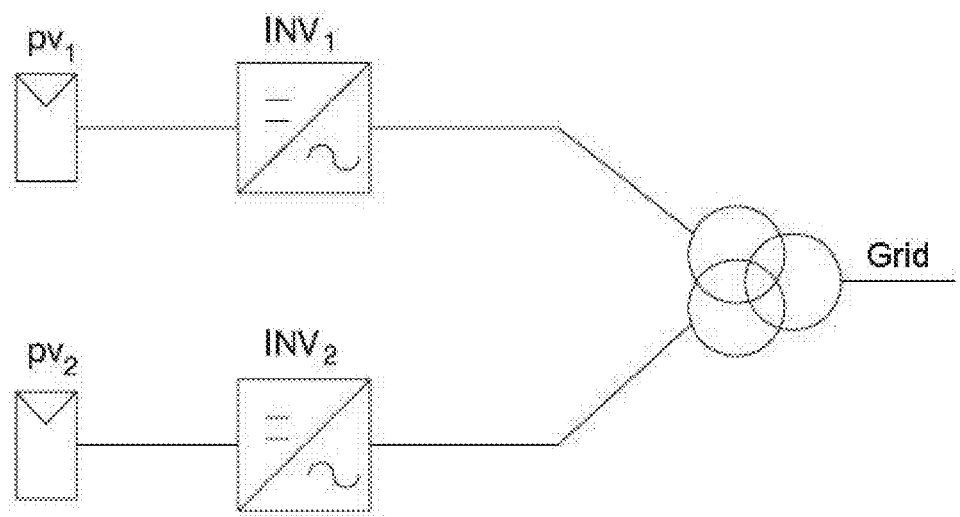
FIG. 4. Shows a diagram for a photovoltaic installation formed by a set of converters connected to a single transformer with several primary windings according to the state of the art.
Figure 5A:
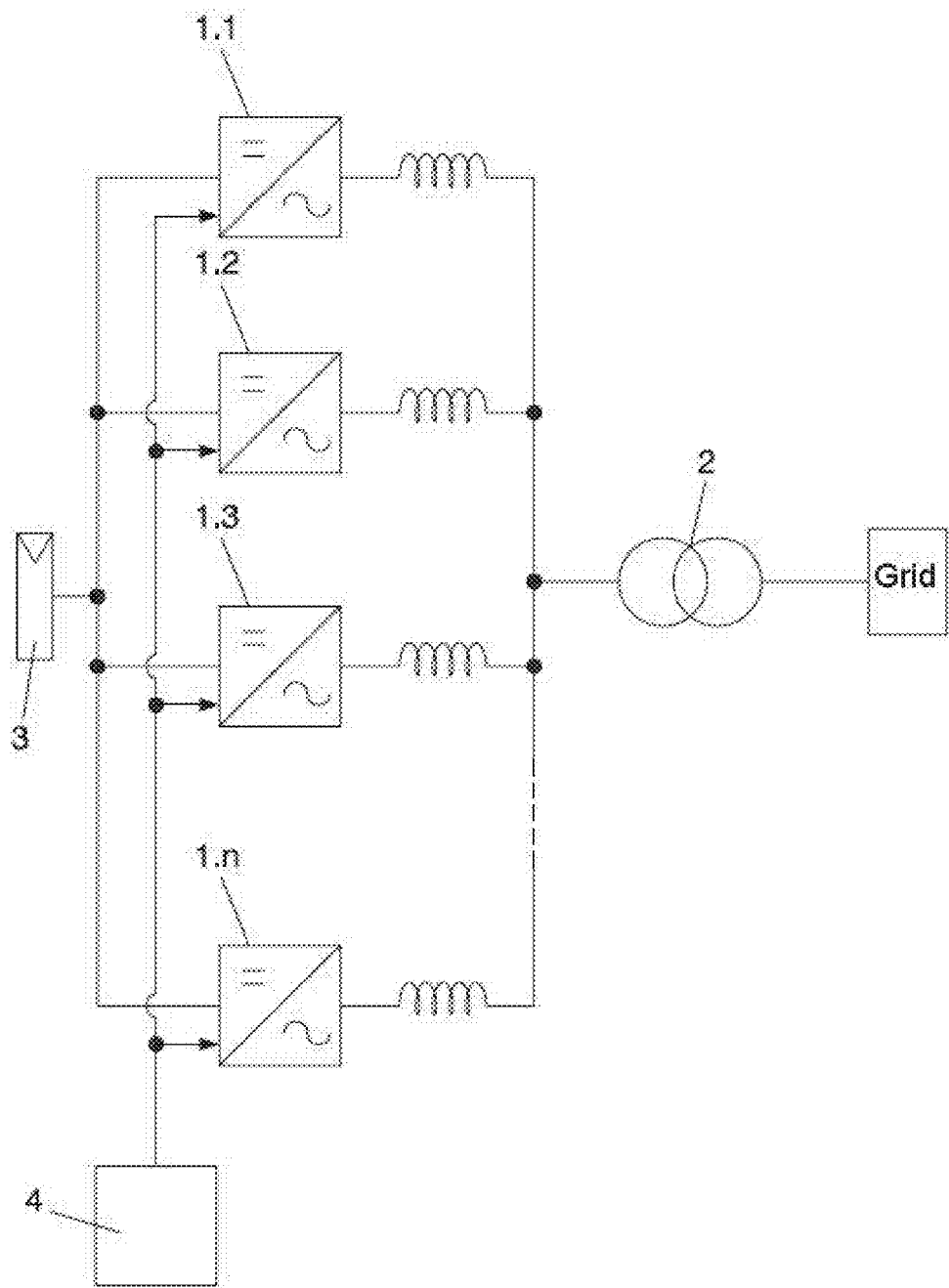
FIG. 5a. Shows a diagram for a photovoltaic installation formed by a set of converters connected to a single transformer with a single photovoltaic generator according to the invention.

FIG. 5a shows a photovoltaic installation performed by a set of DC/AC converters (1.1-1.$n$) connected to a single transformer (2) and a single DC power supply (3), such as a photovoltaic generator. The invention incorporates an auxiliary device (4) that allows matching the common-mode voltage generated by the different DC/AC converters (1.1-1.$n$) so that said voltages fall mainly on the transformer (2).

The DC/AC converters (1.1-1.$n$) are controlled by pulse width modulation (PWM). The common-mode voltages generated by the DC/AC converters (1.1-1.$n$) are matched by matching the carrier signals from all the DC/AC converters (1.1-1.$n$) using the auxiliary device (4) mentioned above, which generates a control signal and transmits it to the different DC/AC converters (1.1-1.$n$).

In another preferred embodiment, the control signal is generated at a DC/AC converter (1.1-1.$n$) and is transmitted to the other DC/AC converters (1.1-1.$n$).

In another preferred embodiment of the invention, a single triangular wave or carrier signal is used in all the DC/AC converters (1.1-1.$n$), said carrier signal being generated at a DC/AC converter (1.1-1.$n$) and transmitted to the other DC/AC converters (1.1-1.$n$).

Figure 5B:
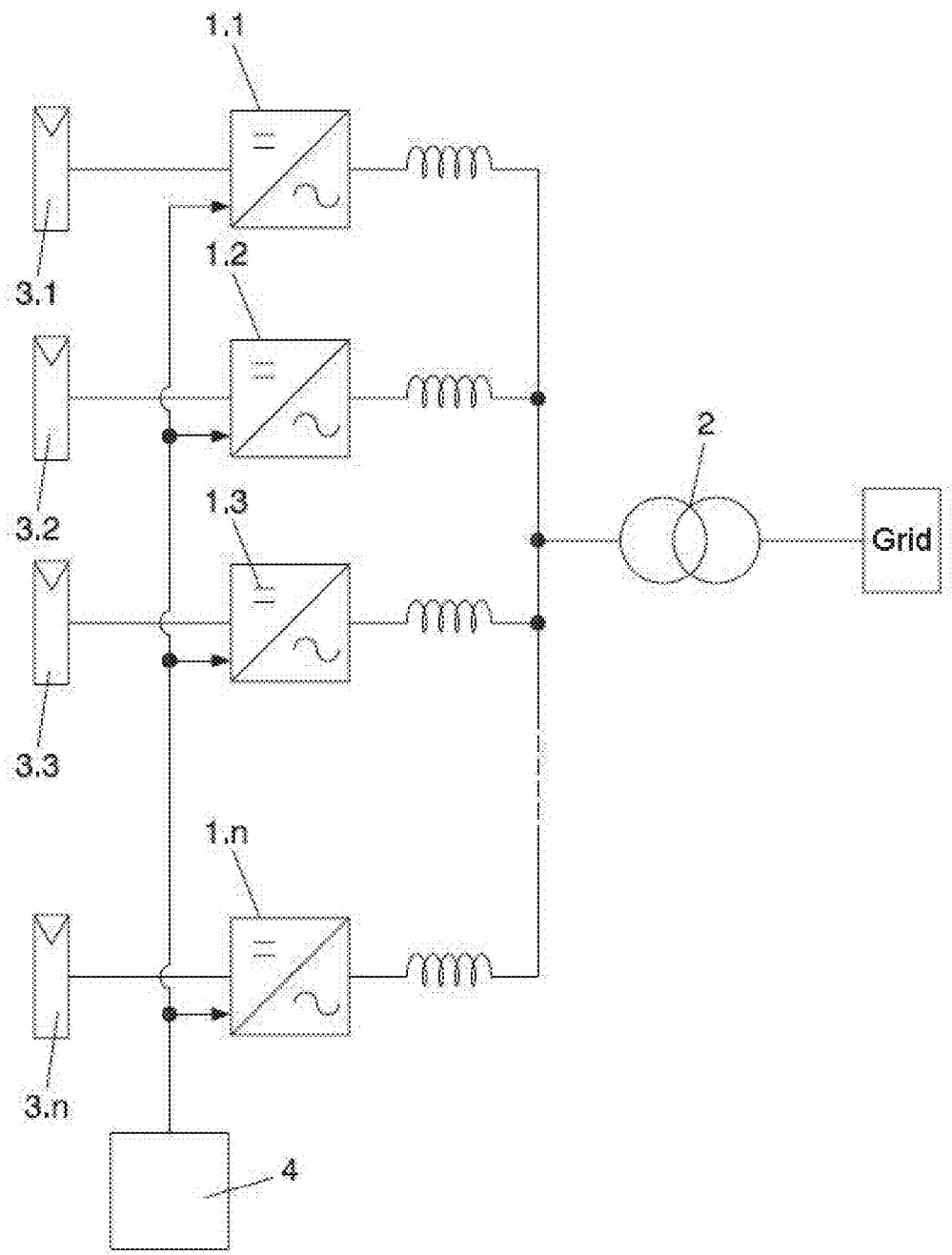
FIG. 5b. Shows a diagram for a photovoltaic installation formed by a set of converters connected to a single transformer in which each converter is connected to a photovoltaic generator according to the invention.

On another hand, FIG. 5b shows another possible preferred embodiment, wherein the DC/AC converters (1.1-1.$n$) are connected to several DC power supplies (3.1-3.$n$).

The invention claimed is:

1. A control method for connecting DC/AC converters in parallel (1.1-1.$n$) at power conversion installations comprising:
    at least one DC power supply (3),
    at least two DC/AC converters (1.1-1.$n$), connected to at least one DC power supply (3), that convert the direct power provided by the DC power supply (3) into alternating power, and
    a transformer (2) provided with a primary winding to which the at least two DC/AC converters (1.1-1.$n$) are connected and a secondary winding of which is connected to a power grid to which the transformer finally injects the alternating power,
    wherein the method comprises matching the common-mode voltages generated by the DC/AC converters (1.1-1.$n$) by matching carrier signals from all the DC/AC converters using an auxiliary device to generate a pulse width modulation (PWM) control signal to control each of the DC/AC converters so that said voltages fall on the transformer (2).

2. The control method for connecting DC/AC converters in parallel (1.1-1.$n$) according to claim 1, wherein the DC/AC converters (1.1-1.$n$) use a single carrier signal to match their common-mode voltages.

3. The control method for connecting DC/AC converters in parallel (1.1-1.$n$) according to claim 2, wherein the carrier signal is generated in a DC/AC converter (1.1-1.$n$) and is transmitted to the other DC/AC converters (1.1-1.$n$).

4. The control method for connecting DC/AC converters in parallel (1.1.-1.$n$) according to claim 1, wherein carrier signals of the DC/AC converters (1.1.-1.$n$) are matched by a system connected to said DC/AC converters (1.1.-1.$n$).

5. The control method for connecting DC/AC converters in parallel (1.1-1.$n$) according to claim 4, wherein the system that matches the carrier signals from the DC/AC converters (1.1.-1.$n$.) is based on a control signal that is transmitted to the DC/AC converters (1.1.-1.$n$.).

6. The control method for connecting DC/AC converters in parallel (1.1-1.$n$) according to claim 5, wherein the control signal is generated in a DC/AC converter (1.1-1.$n$).

7. The control method for connecting DC/AC converters in parallel (1.1-1.$n$) according to claim 5, wherein the control signal is distributed by a physical medium chosen from among fibre-optics, twisted pair copper wire or a communications system.

8. The control method for connecting DC/AC converters in parallel (1.1-1.$n$) according to claim 1, wherein the primary winding of the transformer (2) provides an ungrounded connection to the grid that connects the different DC/AC converters (1.1-1.$n$).

9. The control method for connecting DC/AC converters in parallel according to claim 1, wherein the DC/AC converter (1.1-1.$n$) does not have galvanic insulation.

10. The control method for connecting DC/AC converters in parallel (1.1-1.$n$) according to claim 1, wherein each DC/AC converter (1.1-1.$n$) is connected to an independent DC power supply (3.1-3.$n$).

11. The control method for connecting DC/AC converters in parallel (1.1-1.$n$) according to claim 1, wherein several DC/AC converters (1.1-1.$n$) are connected in parallel with a single DC power supply (3).

12. The control method for connecting DC/AC converters in parallel (1.1-1.$n$) according to claim 1, wherein the DC power supply (3) is chosen from a photovoltaic generator, a wind turbine with DC output, power generation by electro-chemical cells or other devices providing continuous power.

13. The control method for connecting DC/AC converters in parallel (1.1-1.$n$) according to claim 1, wherein the DC power supply (3) is insulated from ground.

14. The control method for connecting DC/AC converters in parallel (1.1-1.$n$) according to claim 1, wherein the DC power supply (3) is connected to ground at one of a positive pole or a negative pole of the DC power supply.

* * * * *